July 6, 1965     W. J. GREENLEAF     3,192,603

CUTTING TOOL

Filed Feb. 6, 1964

INVENTOR.

Walter J. Greenleaf

BY Ralph Hammar

Attorney 3,192,603
CUTTING TOOL
Walter J. Greenleaf, R.D. 3, Meadville, Pa.
Filed Feb. 6, 1964, Ser. No. 342,967
4 Claims. (Cl. 29—96)

This invention is an indexable bit cutting tool in which the bit is clamped edgewise between a pin projecting through a central hole in the bit and a pivoted clamp engaging an inactive edge of the bit.

Figure 3:
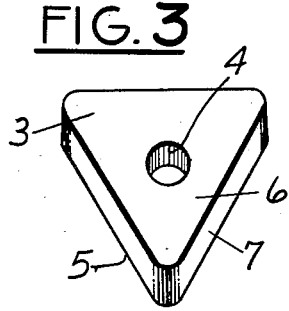
Figure 1:
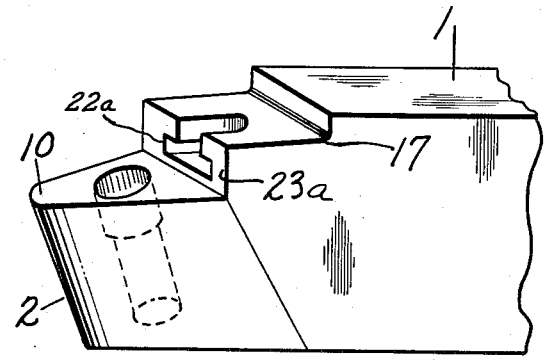
Figure 2:
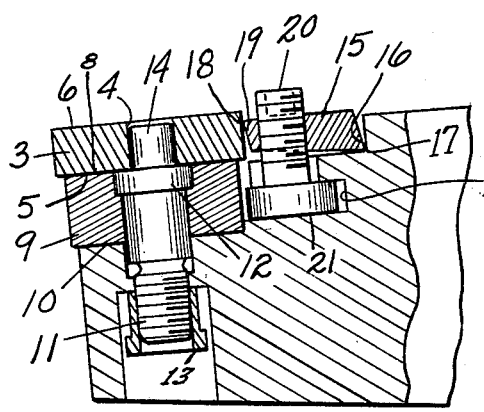
Figure 5:
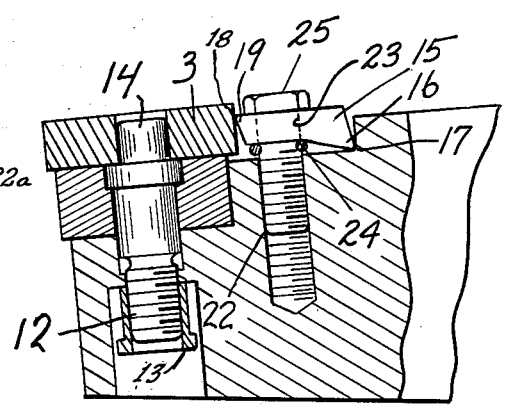
Figure 4:
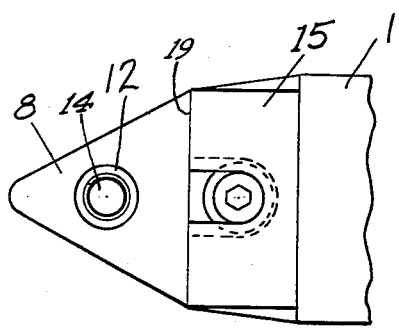

In the drawing, FIG. 1 is a perspective of the bit supporting section of the tool; FIG. 2 is a side elevation of the tool, partly in section; FIG. 3 is a perspective of a triangular bit; FIG. 4 is a top plan view of the tool with the bit removed; and FIG. 5 is a side elevation of a modification.

The invention is shown applied to a single point cutting tool using triangular bits although it is obviously applicable to multiple point cutting tools and tools using bits of other polygonal shapes.

The tool has a body 1 with a head 2 for supporting an indexable triangular bit 3 of the type having a central hole 4 perpendicular to end faces 5 and 6 and parallel to the planes of side edges 7.

The bit is supported on a bit seat 8 which may be integral with the head 2 but is preferably the upper surface of a replaceable anvil 9 bolted to a step 10 at the front of the head by a bolt 11 having a head 12 recessed into the top of the anvil and tightened by a nut 13 pulling the anvil tightly against the step 10, taking up all lost motion. When tightened, the replaceable anvil 9 is rigid with the head of the cutter.

Integral with the upper end of the bolt 11 is a pin 14 of height slightly less than the thickness of the bit 3. The pin 14 is received in the center hole 4 of the bit. The center hole of the bit is accurately positioned the same distance from each of the cutting edges of the bit so that as the bit is indexed to bring a new cutting edge into cutting position, the cooperation of the pin 14 with the center hole makes the new cutting edge assume the same position occupied by the old cutting edge. To accomplish this, it is important that the bit always be held in the same relation to the pin 14 as any difference would show up in inaccurate positioning of the new cutting edge. This is accomplished by a clamp 15 having its lower back edge 16 pivoted on a shoulder 17 below the center of the bolt and having its front edge 19 engaging an inactive edge 18 slightly above the center of the bit. As the clamp 15 is pivoted downward, the bit is urged edgewise forward against the pin 14 in a straight line so that the bit always assumes the same position with respect to the center pin. The inactive edge 18 is compelled to align with the front edge 19 of the clamp. There must be some clearance between the center hole 4 in the bit and the pin 14 to permit turning or indexing of the bit to change cutting edges. The clamp 15 takes up this clearance in a uniform manner so that there is no side thrust which could cause shifting of the cutting edge. At the same time that the bit 3 is moved forward, there is a slight downward component of force urging the bit down against the seating surface 8. During cutting, there is a substantial downward force tending to hold the bit against its seat so that the edgewise clamping force exerted by the clamp 15 is adequate to hold the bit so it cannot work loose, even under heavy loads.

The clamp 15 is moved by a screw 20 having a head 21 received in a T-slot 22a extending back through a riser 23a at the rear of the anvil 9. When the anvil is in place, the screw cannot be removed from the T-slot because the entrance to the T-slot is blocked by the anvil. The screw is free to slide along the T-slot as required by the pivotal movement of the clamp. The upper end of the screw is threaded into the clamp so that when the screw is turned in the direction to release the clamp, the clamp is lifted, thereby quickly releasing the clamping force between the edge 19 of the clamp and the inactive edge 18 of the bit. When the clamping force is released, the bit can be lifted off the pin 14 and turned to bring a new edge to cutting position. Only a fraction of a turn of the screw 20 is necessary to clamp or release the bit. There is a toggle action in the clamp which provides mechanical advantage for the clamping force. However, in the clamped position, the edge 19 of the clamp engages the bit 3 above the pivot 17 so the toggle is not on dead center.

Instead of the T-slot construction of FIG. 3, it is possible to have the clamp 15 actuated by a screw 22 threaded into the head. The screw 22 has a section 23 journaled in the clamp and has a snap ring 24 which lifts the clamp as the screw is turned to release the clamping force on the bit. As the screw is turned to tighten the clamp, the head 25 of the screw moves the clamp downward.

The clamp 15 provides a simple structure for accurately clamping the bit against its center pin. Preferably, the front and back edges 19 and 16 of the clamp 15 are parallel to each other and the pivot or shoulder 17 on the head is parallel to the desired position of the inactive edge 18 of the bit. The clamping force of the clamp is always exerted perpendicular to the inactive edge 18 of the bit with no side force which could cause inaccurate positioning of the cutting edge. Accurate positioning of the cutting edge is of extreme importance in indexable bits in order to maintain uniform production. The action of the clamp is not dependent upon the force with which the screws 20 or 22 are tightened. The center pin 14 is stressed in shear and is extremely rigid. Once the clearance between the center hole 4 and pin is taken up, additional tightening force applied to the screws 20 or 22 will not change the position of the bit.

What is claimed as new is:

1. An indexable bit cutting tool having a head with a bit seat and a pin fixed to the head and having a portion upstanding above and perpendicular to the bit seat, an indexable polygonal bit seated on said bit seat and having a center hole telescoped over said upstanding portion of the pin and having an active edge in cutting position and an inactive edge to the rear of said active edge, a clamp having a front edge engaging said inactive edge of the bit above the bit seat and a back edge pivoted on the head below the front edge, and means for pivoting the clamp to force the bit edgewise against the pin.

2. An indexable bit cutting tool having a head with a bit seat and a pin fixed to the head and having a portion upstanding above and perpendicular to the bit seat, an indexable polygonal bit seated on said bit seat and having a center hole telescoped over said upstanding portion of the pin and having an active edge in cutting position and an inactive edge to the rear of said active edge, said head having a pivot lying in a plane below the upper surface of the bit and parallel to said inactive edge of the bit, a clamp having a front edge engaging said inactive edge of the bit in a plane above said first plane and said clamp having a back edge engaging said pivot, and means for pivoting the clamp about said pivot to force the bit edgewise against the pin.

3. An indexable bit cutting tool having a head with a bit seat and a pin upstanding above and perpendicular to the bit seat, an indexable polygonal bit seated on said bit seat and having a center hole telescoped over said pin and having an active edge in cutting position and an inactive edge to the rear of said active edge, a clamp having a front edge parallel to and engaging said inactive edge of the bit above the bit seat and a back edge pivoted on the head below and parallel to the front edge, and means for pivoting the clamp to force the bit edgewise against the pin.

4. An indexable bit cutting tool having a head with a bit seat and a pin upstanding above the bit seat, an indexable polygonal bit seated on said bit seat and having a center hole telescoped over said pin and having an active edge in cutting position and an inactive edge to the rear of said active edge, said head having a pivot lying in a plane adjacent the bit seat and parallel to said inactive edge of the bit, a clamp having a front edge prallel to and engaging said inactive edge of the bit in a plane above said first plane and said clamp having a back edge parallel to the front edge and engaging said pivot, and means for pivoting the clamp about said pivot to force the bit edgewise against the pin.

References Cited by the Examiner

UNITED STATES PATENTS

| 1,493,626 | 5/24 | Gerhardt | 29—105 X |
| 2,245,446 | 6/41 | Sheldrick | 29—105 |
| 2,665,893 | 1/54 | Ball | 29—105 X |
| 2,842,233 | 7/58 | Greenleaf | 29—105 X |
| 3,059,316 | 10/62 | Bader | 29—96 |

FOREIGN PATENTS

| 647,021 | 8/62 | Canada. |
| 239,258 | 9/25 | Great Britain. |

OTHER REFERENCES

"Russian Carbides Compare With Western Products," an article from Metalworking Production Magazine of August 2, 1961, pp. 11 and 12.

WILLIAM W. DYER, JR., *Primary Examiner.*